M. M. MORATTA.
PISTON RING.
APPLICATION FILED OCT. 29, 1920.

1,391,845. Patented Sept. 27, 1921.

INVENTOR.
Mathew M. Moratta

UNITED STATES PATENT OFFICE.

MATHEW M. MORATTA, OF PRINCETON, INDIANA.

PISTON-RING.

1,391,845.

Specification of Letters Patent.  Patented Sept. 27, 1921.

Application filed October 29, 1920. Serial No. 420,403.

*To all whom it may concern:*

Be it known that I, MATHEW M. MORATTA, a citizen of the United States, residing at Princeton, in the county of Gibson and State of Indiana, have invented certain new and useful Improvements in a Piston-Ring, of which the following is a specification.

This invention relates to piston rings and the primary object is to provide complementary members of identical construction adapted to be assembled to form a piston ring which will be devoid of any openings or gaps between the normally engaging portions of the ring.

One of the objects of the invention is to provide complementary members to form a piston ring which will eliminate the use of dowel pins and which will be constructed so that each of the complementary members comprising the ring will present a continuous unbroken surface devoid of any open gaps or spaces.

Other objects of the invention will appear upon consideration of the following detailed description and accompanying drawings, wherein:—

Figure 1:
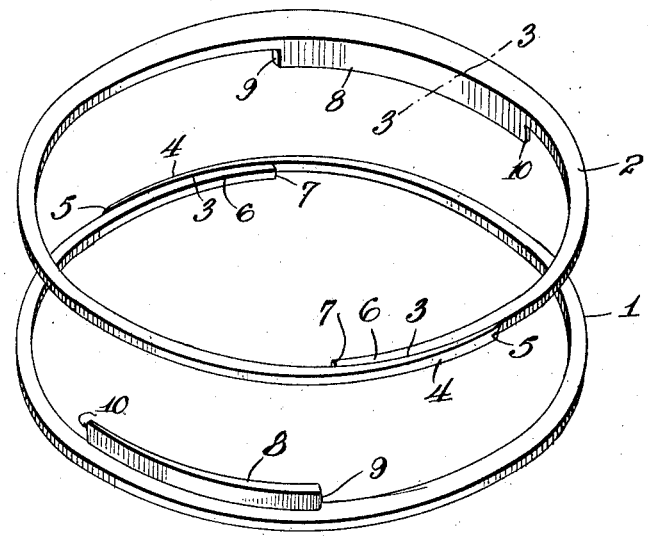
Figure 1 is a perspective view of the ring constructed in accordance with my invention and showing the complementary members separated.
Figure 2:
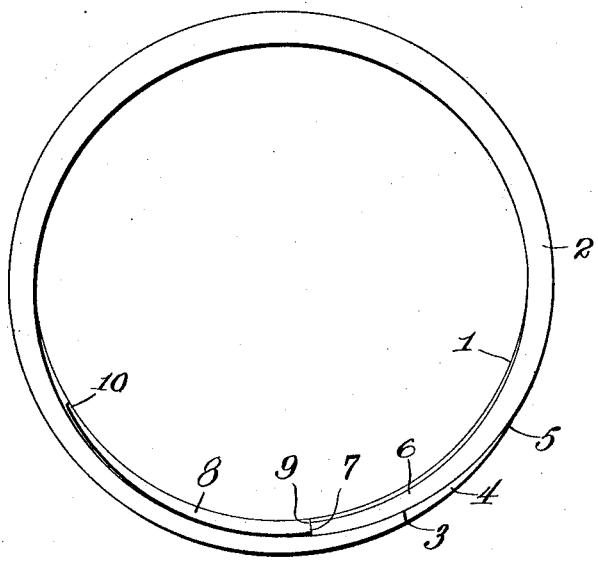
Fig. 2 is a side elevation of the two members assembled.
Figure 3:
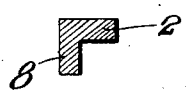
Fig. 3 is a cross section taken on the line 3—3 of Fig. 1.

Referring to the drawing by numerals, the piston ring comprises complementary members 1 and 2 which are identical in formation and which are adapted to be assembled to form the complete piston ring. Each member has its meeting ends overlapped as indicated at 3, the outer overlapped end 4 being tapered to a fine edge as indicated at 5 in Fig. 2 so that a practically smooth surface is presented by the outer surfaces of the overlapped portions of the ring where they meet. The terminal of the inner overlapped member 6, however, is cut off sharply as indicated at 7 so that an abrupt terminal is provided which forms a shoulder for the member.

The two members when assembled are adapted to be disposed reversely to each other. To prevent relative rotary movement of the members, each member is provided with a segmental flange 8 which is tapered from a relatively wide end 9 to a narrow end 10 and the wide end 9 is diametrically opposite the abrupt end 7 of the other member so that the member 8 forms an abutment flange for the shoulder formed by the end 7 of the complementary member. Attention is directed to the fact that the flange 8 extends upwardly from the inner edge of the member and not from the outer edge and the inner surface of the flange is flush with the inner surface of the member. Thus the outer surface of the ring when the two members are assembled is practically unbroken and no open gaps or spaces are formed.

What is claimed is:—

1. A piston ring comprising a pair of complementary circular members having their ends separated and adapted to be overlapped for a considerable portion of their surfaces, the outer overlapped end portion being tapered to a fine point, the inner overlapped portion being cut abruptly to provide a shoulder, and a flange formed approximately diametrically opposite the said overlapped end, and of tapered formation to provide an abutment member adapted to engage the said shoulder, of the corresponding complementary member.

2. A piston ring comprising two complementary rings having their ends separated and adapted to be overlapped, the outer overlapped portion of each ring being tapered to a fine edge, the inner overlapped portion being cut abruptly to provide a shoulder, a tapered segmentary flange formed on each member and having its large end shaped to provide an abutment member adapted to engage the said shoulder of the other member.

3. A piston ring comprising complementary ring members each provided with a segmental flange extending from its inner edge and of a width equal to the thickness of the corresponding ring member, the said segmental flange being tapered from a relatively wide end to a narrow end whereby an abutment shoulder is provided at the wide end of the said flange, the separated ends of the said ring members being overlapped and assembled to provide a shoulder adapted to engage the said wide end of the flange member on the corresponding ring member.

In testimony whereof I have affixed my signature in the presence of two witnesses.

MATHEW M. MORATTA.

Witnesses:
CHARLES A. NIRMEIER,
DAVID BAMMER.